United States Patent
Sakamaki et al.

(10) Patent No.: US 9,368,083 B2
(45) Date of Patent: Jun. 14, 2016

(54) LIQUID CRYSTAL DISPLAY DEVICE ADAPTED TO PARTIAL DISPLAY

(71) Applicant: Synaptics Display Devices GK, Tokyo (JP)

(72) Inventors: Goro Sakamaki, Tokyo (JP); Ki-hwak Yun, Tokyo (JP)

(73) Assignee: Synaptics Display Devices GK, Tokyo (JP)

( * ) Notice: Subject to any disclaimer, the term of this patent is extended or adjusted under 35 U.S.C. 154(b) by 0 days.

(21) Appl. No.: 14/582,048

(22) Filed: Dec. 23, 2014

(65) Prior Publication Data

US 2015/0187295 A1  Jul. 2, 2015

(30) Foreign Application Priority Data

Dec. 26, 2013  (JP) ................................. 2013-269054

(51) Int. Cl.
*G06F 3/038* (2013.01)
*G09G 5/00* (2006.01)
*G09G 3/36* (2006.01)
*G02F 1/1333* (2006.01)

(52) U.S. Cl.
CPC ............ *G09G 3/3648* (2013.01); *G09G 3/3655* (2013.01); *G09G 3/3688* (2013.01); *G02F 2001/133391* (2013.01); *G09G 2300/0408* (2013.01); *G09G 2310/027* (2013.01); *G09G 2310/04* (2013.01)

(58) Field of Classification Search
CPC .............. G09G 3/3688; G09G 3/3648; G09G 2330/021; G09G 2330/02; G09G 3/369
USPC ............................. 345/87–100, 204, 211–213
See application file for complete search history.

(56) References Cited

U.S. PATENT DOCUMENTS

| | | | | |
|---|---|---|---|---|
| 2004/0150609 A1* | 8/2004 | Kim | ..................... | G09G 3/3688 345/100 |
| 2008/0106535 A1* | 5/2008 | Kim | ..................... | G09G 3/3648 345/205 |
| 2009/0295693 A1* | 12/2009 | Yeom | ................... | G09G 3/3648 345/88 |
| 2010/0109990 A1* | 5/2010 | Harada | ................ | G09G 3/3614 345/87 |
| 2010/0156949 A1* | 6/2010 | Park | ..................... | G09G 3/3607 345/690 |
| 2010/0309230 A1* | 12/2010 | Cho | ..................... | G09G 3/3413 345/690 |
| 2011/0037748 A1* | 2/2011 | Kang | ................... | G09G 3/3426 345/211 |

(Continued)

FOREIGN PATENT DOCUMENTS

JP  2009-109705 A  10/2007

*Primary Examiner* — Kimnhung Nguyen
(74) *Attorney, Agent, or Firm* — Patterson + Sheridan, LLP

(57) ABSTRACT

A liquid crystal display device includes a liquid crystal display panel; and a driver driving the liquid crystal display panel. The liquid crystal display panel includes: a first substrate on which subpixels each including a pixel electrode are integrated; and a second substrate opposed to the first substrate, a plurality of common electrodes being formed on the second substrate. The display region of the liquid crystal display panel is divided into a plurality of sections respectively corresponding to the common electrodes. When a partial display in which an image is selectively displayed in a selected section is performed, the liquid crystal driver drives the common electrode corresponding to the selected section to a predetermined common voltage level, sets the common electrodes corresponding to the non-selected sections to a predetermined reference level, and sets pixel electrodes of subpixels in the non-selected sections to the reference voltage level.

20 Claims, 14 Drawing Sheets

(56) References Cited

U.S. PATENT DOCUMENTS

| | | | |
|---|---|---|---|
| 2012/0081352 A1* | 4/2012 | Yamagishi | G09G 3/3614 345/212 |
| 2012/0162183 A1* | 6/2012 | Kwon | G09G 3/3614 345/212 |
| 2012/0162273 A1* | 6/2012 | No | G09G 3/3648 345/690 |
| 2012/0206437 A1* | 8/2012 | Kang | G09G 3/3614 345/213 |
| 2013/0328850 A1* | 12/2013 | You | G02F 1/13624 345/211 |

* cited by examiner

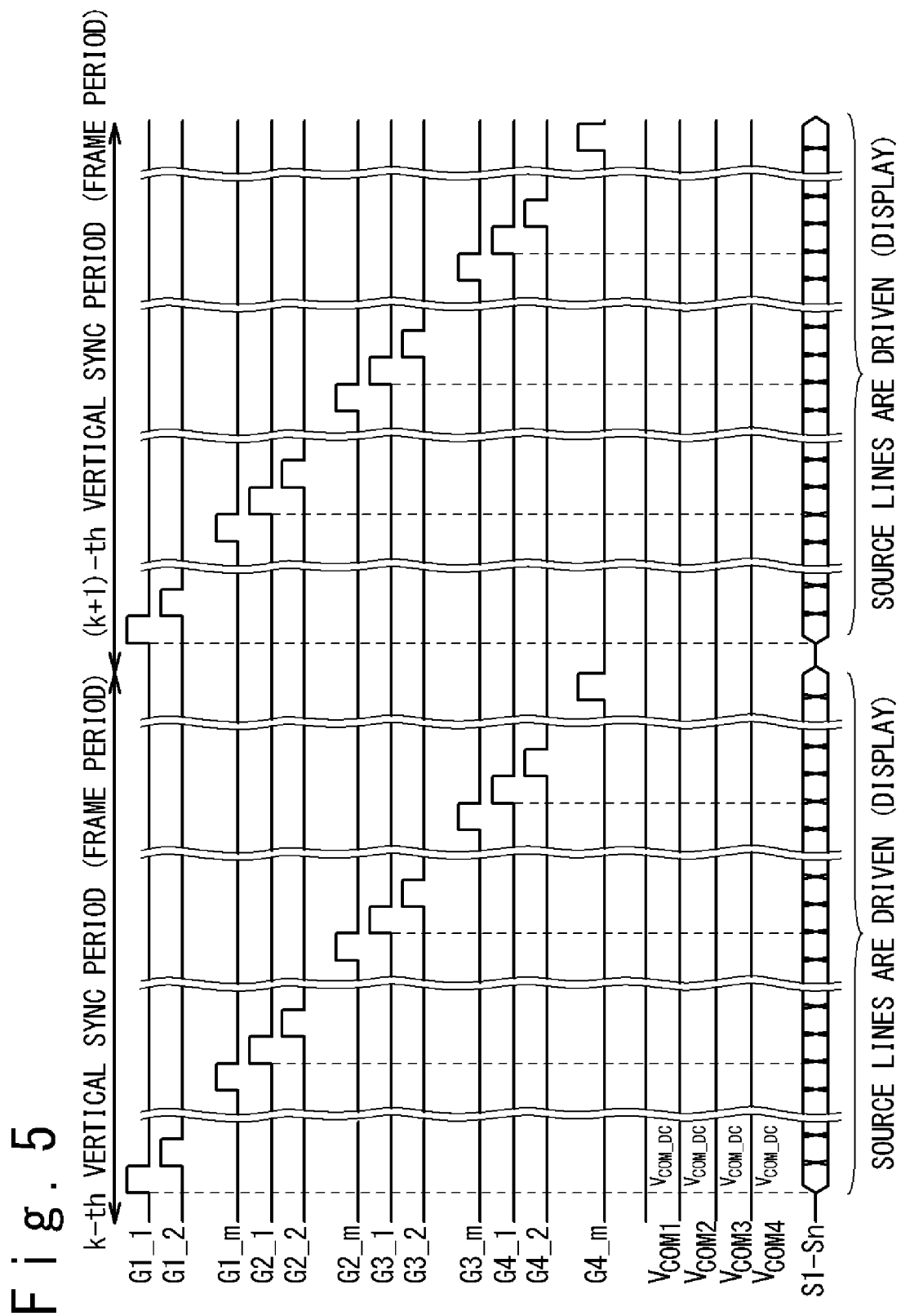

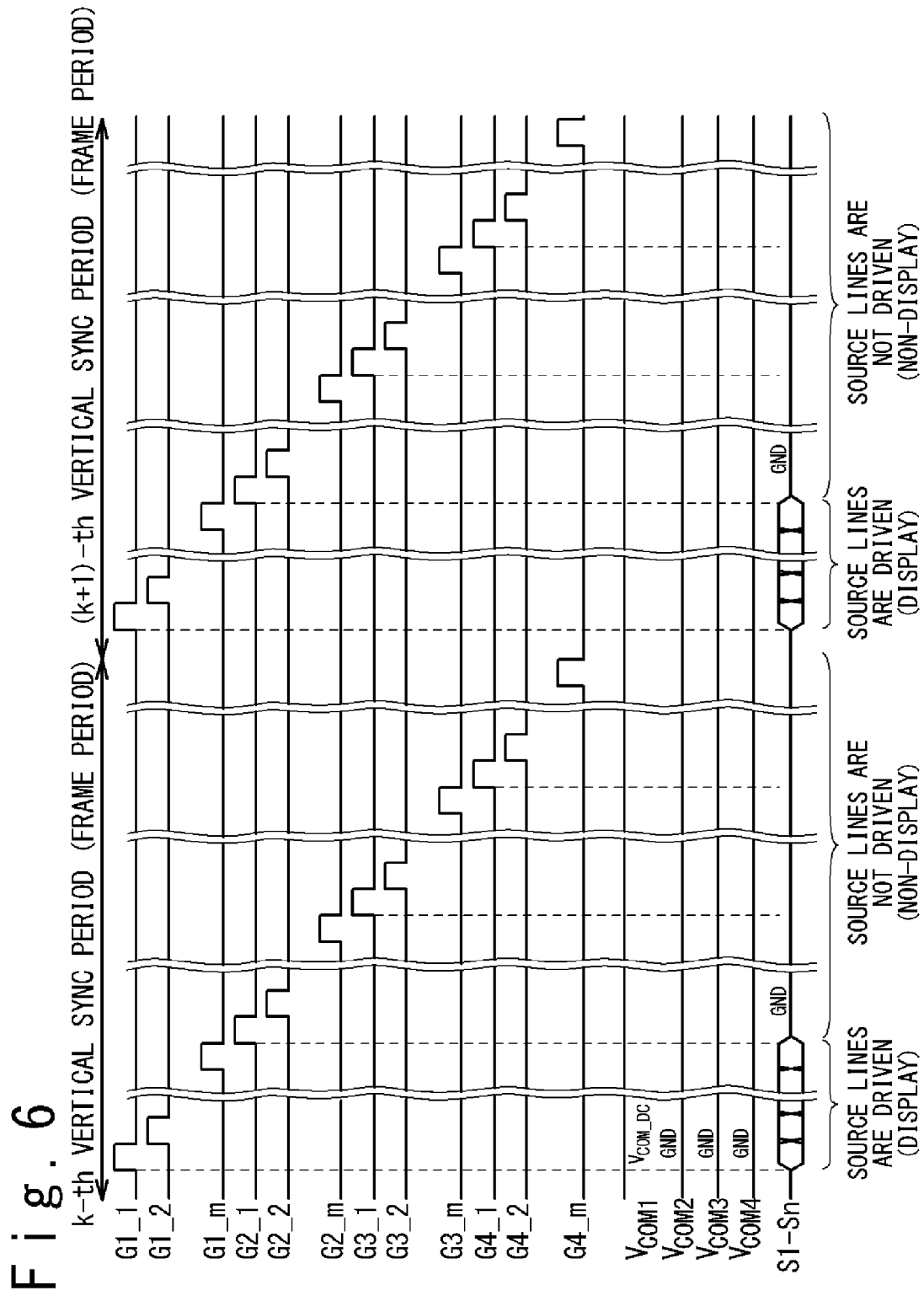

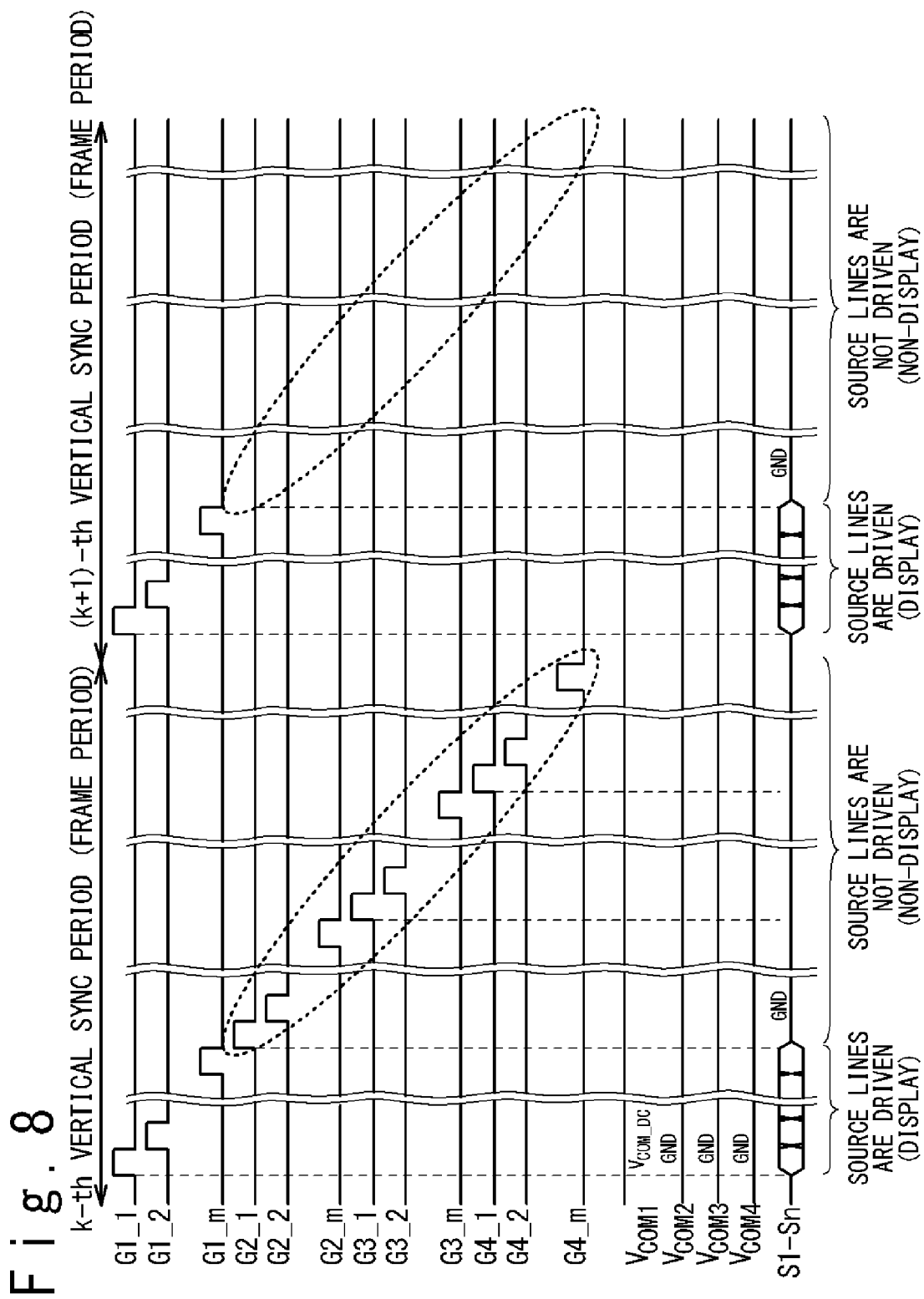

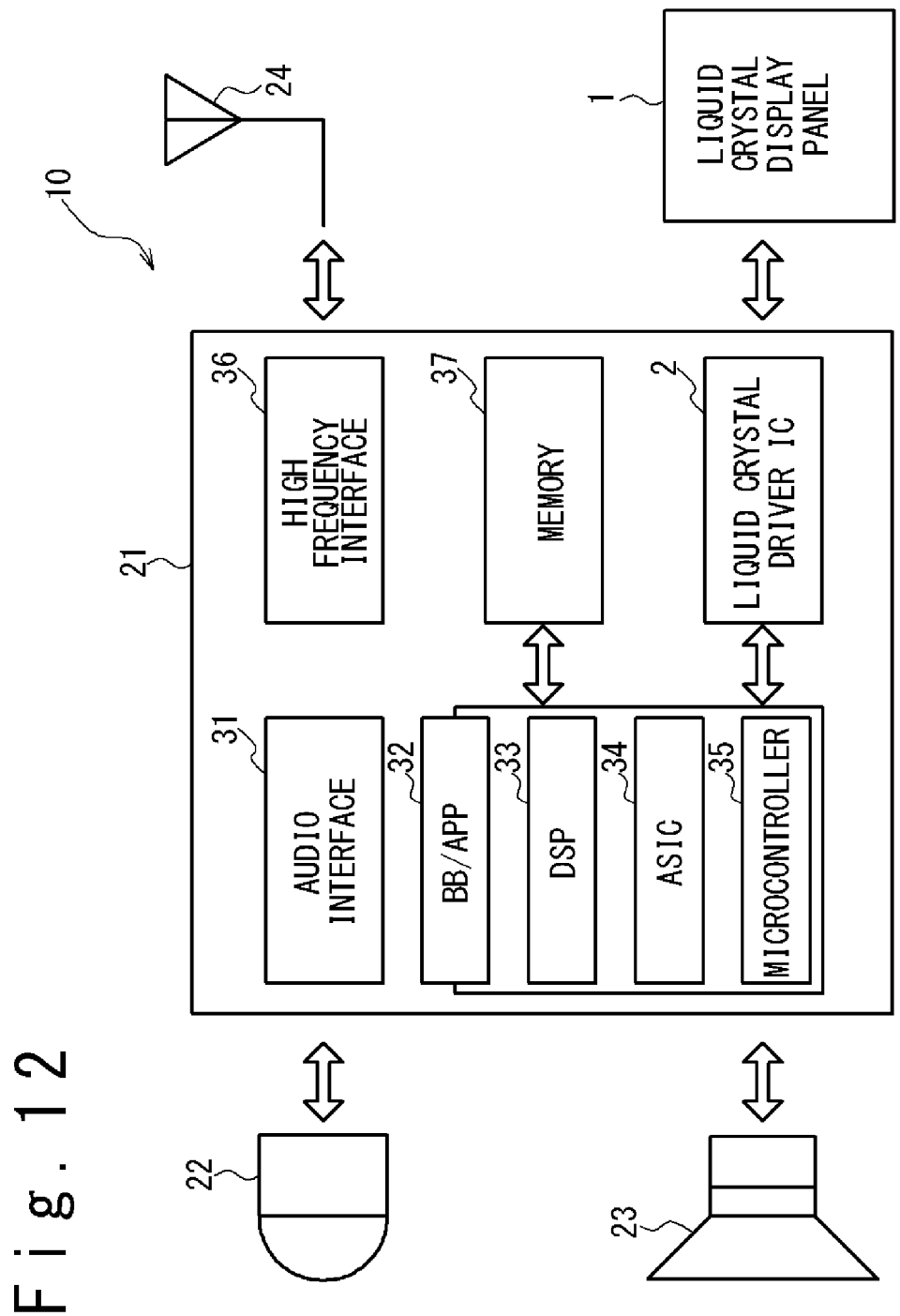

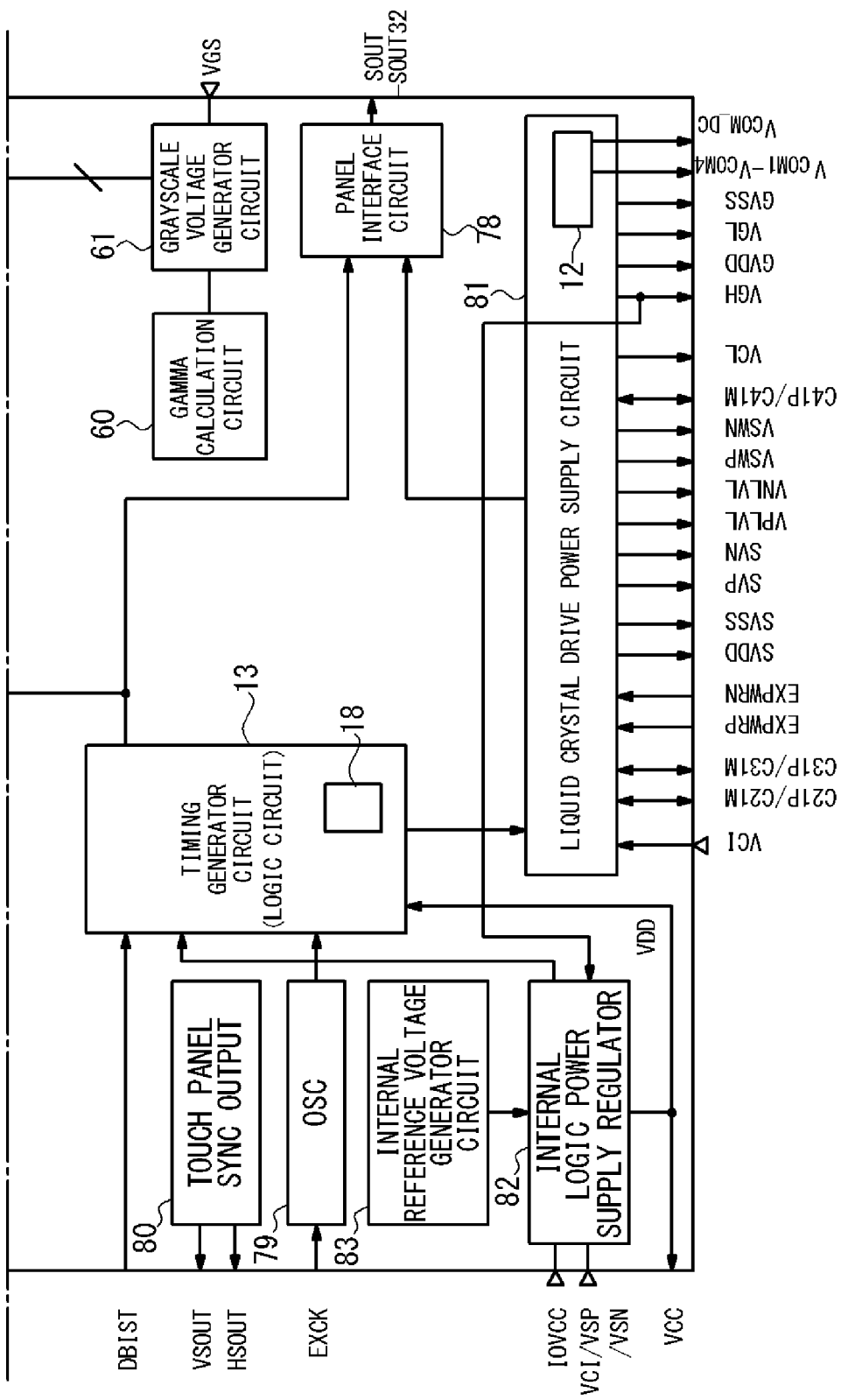

LIQUID CRYSTAL DISPLAY DEVICE ADAPTED TO PARTIAL DISPLAY

CROSS REFERENCE

This application claims priority of Japanese Patent Application No. 2013-269054, filed on Dec. 26, 2013, the disclosure of which is incorporated herein by reference.

TECHNICAL FIELD

The present invention relates to a liquid crystal display device, a liquid crystal driver and a method of driving a liquid crystal display panel.

BACKGROUND ART

Liquid crystal display devices are often required to be adapted to a partial display in which an image is displayed on only a desired part of the display screen. For example, due to the recent trend of the increase in the screen size of portable terminals such as smartphones and tablets, a liquid crystal display device mounted on a portable terminal is often operated to display a desired image (such as, an image of a clock) only on a part of the display screen, when the portable terminal is placed in the standby state.

FIG. 1 is a schematic diagram illustrating an example of the partial display. When a portable terminal 100 including a liquid crystal display device is being operated by the user, that is, when the portable terminal 100 is in the "in-use" state, as illustrated in the left section of FIG. 1, the liquid crystal display device is placed in the full-screen display mode to display an image on the entire display screen. After a certain period of time has elapsed without any operation on the portable terminal 100, the portable terminal 100 moves to the standby state. In the standby state, a partial display, in which an image is displayed on only a part of the display screen of the liquid crystal display panel, is performed in the portable terminal 100. The center section of FIG. 1 illustrates an exemplary operation in which an image of a digital clock is displayed only on part A of the display screen of the liquid crystal display; no image is displayed on the remaining part. After a certain period of time has elapsed after the movement to the standby state, as illustrated in the right section of FIG. 1, the portable terminal 100 moves to the "not-in-use" state, in which no image is displayed on the entire display screen. When a certain operation (for example, a push of a certain button) is performed on the portable terminal 100 in the "not-in-use" state, the portable terminal 100 returns to the standby state. When a certain operation is then performed on the portable terminal 100 in the standby state (for example, when a certain "gesture" is performed on the display screen of the liquid crystal display device), the portable terminal 100 returns to the in-use state.

In general, a conventional liquid crystal display device is configured to drive all the subpixels of the entire display screen even when a partial display is performed. In detail, pixels in the part in which the image is not displayed are operated to display the black color, for example; the respective subpixels of each pixel are driven to display the black color. This is because a liquid crystal display device, in which the common electrode is driven to a specific common level, requires driving all the subpixels with an AC drive scheme to avoid damage to liquid crystal in the liquid crystal display panel. If the subpixels are not driven with an AC drive scheme, a DC voltage is applied between the common electrode and the pixel electrode of each subpixel, and this leads to damage to the liquid crystal.

The above-described conventional operation of a liquid crystal display device unnecessarily increases power consumption in a partial display. Reduction in the power consumption is one of the important requirements of high-resolution liquid crystal display devices for portable terminals, such as liquid crystal display devices mounted on recent smartphones and tablets.

SUMMARY OF INVENTION

Therefore, an objective of the present invention is to provide a liquid crystal display device in which the power consumption is reduced in performing a partial display.

Other objectives and features of the present invention would be understood from the following disclosure.

In an aspect of the present invention, a liquid crystal display device includes a liquid crystal display panel and a liquid crystal driver driving the liquid crystal display panel. The liquid crystal display panel includes: a first substrate on which a plurality of subpixels each including a pixel electrode are integrated; and a second substrate opposed to the first substrate, a plurality of common electrodes being formed on the second substrate. The display region of the liquid crystal display panel is divided into a plurality of sections respectively corresponding to the plurality of common electrodes. When a partial display in which an image is selectively displayed in a section selected from the plurality of sections is performed, the liquid crystal driver drives a common electrode corresponding to the selected section of the plurality of common electrodes to a predetermined common voltage level, sets a common electrode corresponding to a non-selected section of the plurality of common electrodes to a predetermined reference level, drives pixel electrodes of subpixels in the selected section of the plurality of subpixels to pixel voltage levels corresponding to image data, and sets pixel electrodes of subpixels in the non-selected section of the plurality of subpixels to the reference voltage level.

In another aspect of the present invention, a liquid crystal driver is provided which drives a liquid crystal display panel including: a first substrate on which a plurality of subpixels each including a pixel electrode and a plurality of source lines connected with the plurality of subpixels are integrated; and a second substrate opposed to the first substrate, a plurality of common electrodes being formed on the second substrate. The driver includes: a common electrode drive circuit driving the plurality of common electrodes; and a source drive circuit driving the plurality of source lines. When a partial display in which an image is selectively displayed in a section selected from a plurality of sections is performed, the plurality of sections being defined in a display region of the liquid crystal display panel so as to respectively correspond to the plurality of common electrodes, the common electrode drive circuit drives a common electrode corresponding to the selected section of the plurality of common electrodes to a predetermined common voltage level and sets a common electrode corresponding to non-selected section of the plurality of common electrodes to a predetermined reference level, and the source drive circuit drives pixel electrodes of subpixels in the selected section out of the plurality of subpixels to pixel voltage levels corresponding to image data via the source lines and sets pixel electrodes of subpixels in the non-selected section out of the plurality of subpixels to the reference voltage level.

In still another aspect of the present invention, a driving method is provided for driving a liquid crystal display panel including: a first substrate on which a plurality of subpixels each including a pixel electrode are integrated; and a second substrate opposed to the first substrate, a plurality of common electrodes being formed on the second substrate. The driving method includes a step of performing a partial display in which an image is selectively displayed in a section selected from a plurality of sections defined in a display region of the liquid crystal display panel so as to respectively correspond to the plurality of common electrodes.

In the step of performing the partial display, a common electrode corresponding to the selected section of the plurality of common electrodes is driven to a predetermined common voltage level, a common electrode corresponding to non-selected section of the plurality of common electrodes is set to a predetermined reference level, pixel electrodes of subpixels in the selected section out of the plurality of subpixels are driven to pixel voltage levels corresponding to image data and pixel electrodes of subpixels in the non-selected section out of the plurality of subpixels are set to the reference voltage level.

The present invention provides a liquid crystal display device in which the power consumption is reduced in performing a partial display.

BRIEF DESCRIPTION OF THE DRAWINGS

The above and other advantages and features of the present invention will be more apparent from the following description taken in conjunction with the accompanied drawings, in which:

FIG. 5 is a timing chart illustrating an exemplary operation of the liquid crystal display device in performing a full-screen display in an embodiment;

FIG. 6 is a timing chart illustrating an exemplary operation of the liquid crystal display device in performing a partial display in an embodiment;

FIG. 8 is a timing chart illustrating a modification of the operation of the liquid crystal display device in performing a partial display in an embodiment;

FIG. 12 is a block diagram illustrating an exemplary configuration of a portable terminal on which the liquid crystal display device of an embodiment is mounted; and FIGS. 13A and 13B are diagrams illustrating a more specific configuration of the liquid crystal display driver IC of the liquid crystal display device in an embodiment.

DESCRIPTION OF PREFERRED EMBODIMENTS

The invention will be now described herein with reference to illustrative embodiments. Those skilled in the art would recognize that many alternative embodiments can be accomplished using the teachings of the present invention and that the invention is not limited to the embodiments illustrated for explanatory purposes.

For easy understanding of the present invention, a description is first given of a common configuration of a liquid crystal display device and a partial display operation in this liquid crystal display device.

Figure 1:
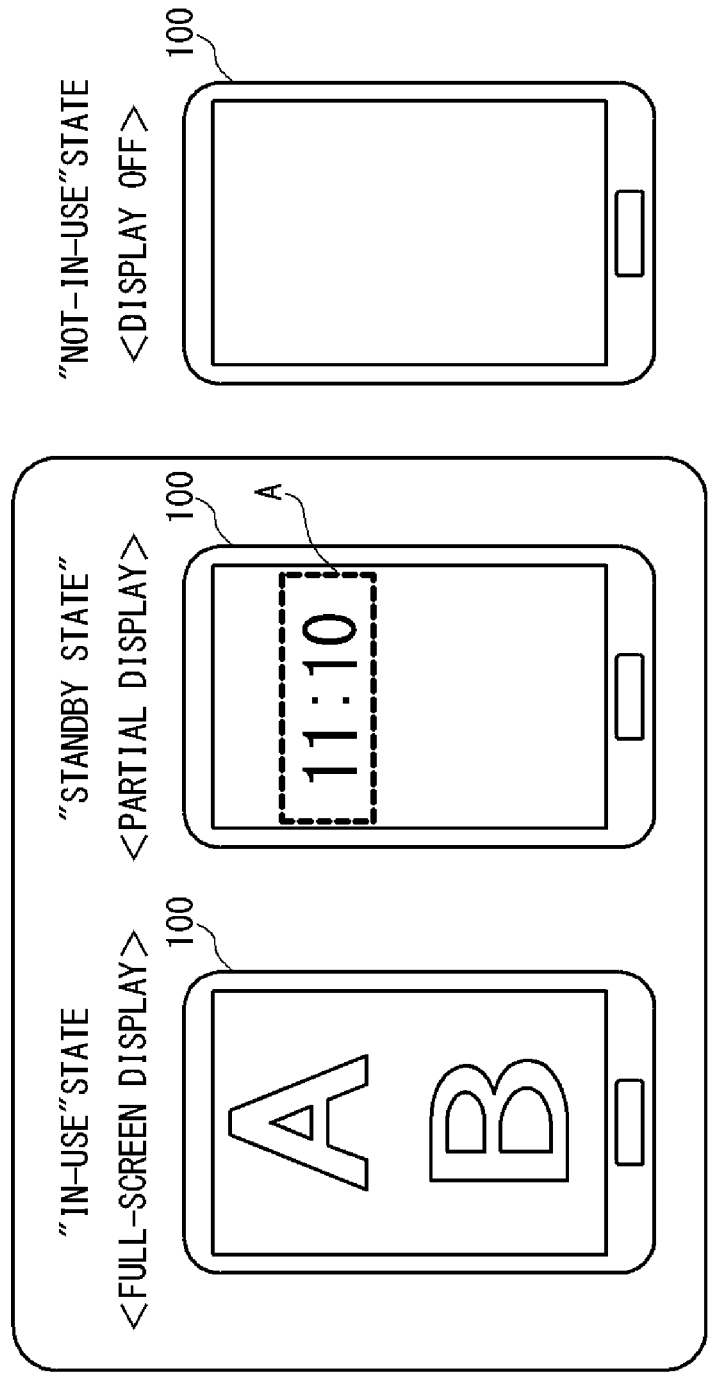
FIG. 1 is a conceptual diagram illustrating an example of the partial display.
Figure 2:
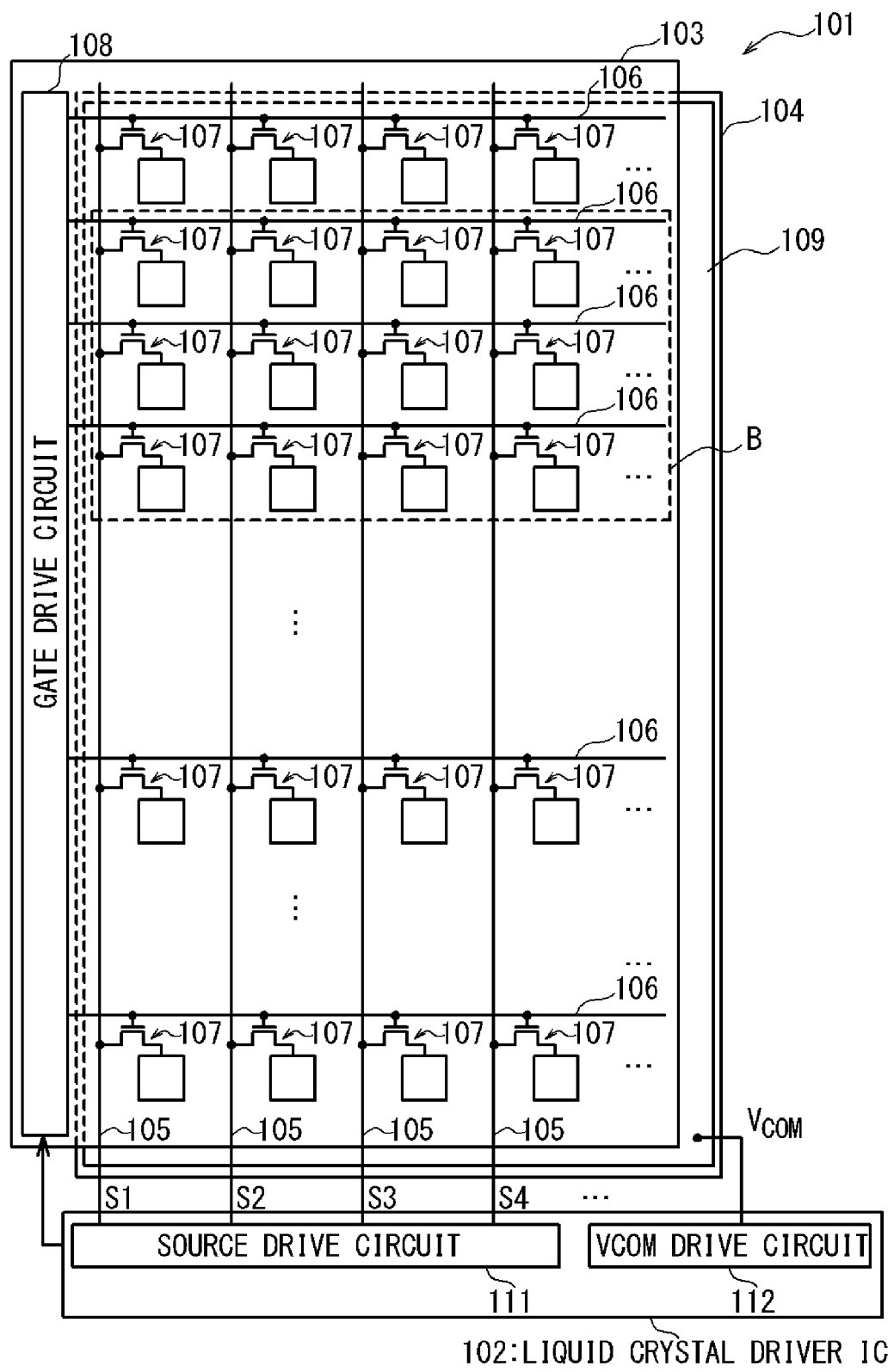
FIG. 2 is a block diagram illustrating a generally-used configuration of a liquid crystal display device.

FIG. 2 is a schematic diagram illustrating a generally-used configuration of a liquid crystal display device. The liquid crystal display device illustrated in FIG. 2 includes a liquid crystal display panel 101 and a liquid crystal driver IC (integrated circuit) 102 that drives the liquid crystal display panel 101. The liquid crystal display panel 101 includes a TFT (thin film transistor) substrate 103 and an opposing substrate 104. Integrated in the TFT substrate 103 are source lines 105, gate lines 106, subpixels 107 and a gate line drive circuit 108. Formed on the opposing substrate 104 is a common electrode 109. The space between the TFT substrate 103 and the opposing substrate 104 is filled with liquid crystal. The liquid crystal driver IC 102 includes a source drive circuit 111 that drives the source lines 105 and a VCOM drive circuit 112 that drives the common electrode 109.

A situation will now be discussed in which a partial display is performed in the liquid crystal display device illustrated in FIG. 2, for example, when an image is displayed only in region B of the liquid crystal display panel 101. When an image is displayed in region B, the subpixels of the pixels in region B are driven and the common electrode 109 is driven to a certain common level $V_{COM}$.

In the meantime, the subpixels of the pixels in the region other than region B are driven to achieve black display, for example. This operation is to avoid damage to the liquid crystal; it is desirable to drive the subpixels 107 of the pixels in the region other than region B with an AC drive scheme, because the common electrode 109 is driven to the common level $V_{COM}$. If the subpixels 107 in the region other than region B are not driven with an AC drive scheme, a DC voltage is applied to the liquid crystal due to the common level $V_{COM}$ applied to the common electrode 109, causing damage to the liquid crystal. The damage to the liquid crystal are often observed as a phenomenon so called "screen burn-in". As thus discussed, the liquid crystal display device illustrated in FIG. 2 eventually involves driving all the subpixels 107 even when an image is displayed only in region B.

The above-described configuration and operation of the conventional liquid crystal display device unnecessarily increases the power consumption in performing a partial display. Presented in the below-described embodiments of the present invention are liquid crystal display devices configured to reduce power consumption in performing a partial display.

Figure 3:
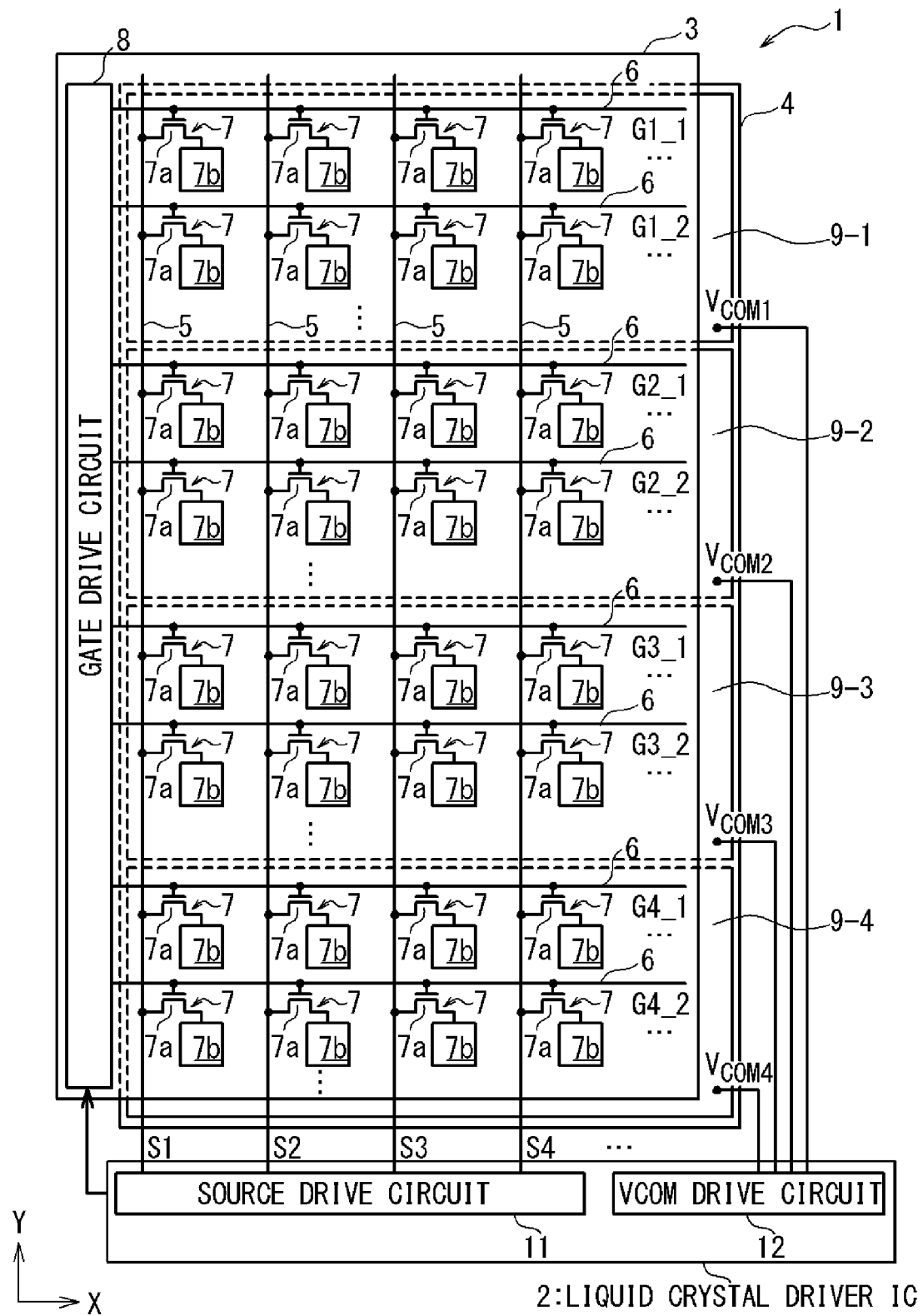
FIG. 3 is a block diagram illustrating an exemplary configuration of a liquid crystal display device in one embodiment of the present invention.

FIG. 3 is a schematic diagram illustrating an exemplary configuration of a liquid crystal display device in one embodiment of the present invention. The liquid crystal display device includes a liquid crystal display panel 1 and a liquid crystal driver IC 2. The liquid crystal display panel 1 includes a TFT substrate 3 and an opposing substrate 4. The TFT substrate 3 and the opposing substrate 4 are opposed and bonded together.

The TFT substrate 3 includes source lines (which may be also referred to as data lines or signal lines) 5 and gate lines (which may be also referred to as digit lines or scan lines) 6 and subpixels 7. In this embodiment, the source lines 5 are disposed to extend in the vertical direction (the Y-axis direction in FIG. 3), and the gate lines 6 are disposed to extend in the horizontal direction (the X-axis direction in FIG. 3). Each subpixel 7 is connected with the corresponding source line 5 and gate line 6.

Each subpixel 7 includes a TFT 7a used as a select transistor and a pixel electrode 7b. The TFT 7a has a source connected with the corresponding source line 5 and a drain connected with the pixel electrode 7b. In this embodiment, each pixel of the liquid crystal display panel 1 includes a predetermined number of subpixels 7 (typically, three or four subpixels 7), and the subpixels 7 of each pixel are used to display different colors (for example, a combination of red, green and blue or a combination of red, green, blue and yellow).

Further integrated on the TFT substrate 3 is a gate drive circuit 8 that drives the gate lines 6. The gate drive circuit 8 may be implemented as a semiconductor circuit integrated on the glass substrate of the TFT substrate 3 with a GIP (gate-in-panel) technology. Alternatively, a gate drive circuit 8 may be integrated within an IC chip and mounted on the glass substrate of the TFT substrate 3 with a COG (chip on glass) technology.

The opposing substrate 4 includes a plurality of common electrodes (opposing electrodes) 9. In other words, the common electrode disposed on the opposing substrate 4 is divided into a plurality of electrode elements in the liquid crystal display device of this embodiment. Such structure, which is one feature of the liquid crystal display device in this embodiment, is of significance for reducing the power consumption in performing a partial display, as described later.

More specifically, the display region of the liquid crystal display panel 1 (that is, the region in which the subpixels 7 are arrayed) is divided into four sections and four common electrodes 9-1 to 9-4 are respectively disposed in the four sections. In the configuration illustrated in FIG. 3, the common electrodes 9-1 to 9-4 are arrayed in the Y-axis direction. The common electrode 9-1 is opposed to the pixel electrodes 7b of the subpixels 7 disposed in the section corresponding to the common electrode 9-1 and the common electrode 9-2 is opposed to the pixel electrodes 7b of the subpixels 7 disposed in the section corresponding to the common electrode 9-2. Correspondingly, the common electrode 9-3 is opposed to the pixel electrodes 7b of the subpixels 7 disposed in the section corresponding to the common electrode 9-3 and the common electrode 9-4 is opposed to the pixel electrodes 7b of the subpixels 7 disposed in the section corresponding to the common electrode 9-4. The space between the common electrodes 9-1 to 9-4 and the pixel electrodes 7b of the respective subpixels 7 is filled with liquid crystal.

In this embodiment, m gate lines 6 are disposed in the section corresponding to each of the common electrodes 9-1 to 9-4. The m gate lines 6 in the section corresponding to the common electrode 9-1 may be referred to as gate lines G1_1 to G1_m (only gate lines G1_1 and G1_2 are illustrated in FIG. 3), and the m gate lines 6 in the section corresponding to the common electrode 9-2 may be referred to as gate lines G2_1 to G2_m (only gate lines G2_1 and G2_2 are illustrated in FIG. 3). Correspondingly, the m gate lines 6 in the section corresponding to the common electrode 9-3 may be referred to as gate lines G3_1 to G3_m (only gate lines G3_1 and G3_2 are illustrated in FIG. 3), and the m gate lines 6 in the section corresponding to the common electrode 9-4 may be referred to as gate lines G4_1 to G4_m (only gate lines G4_1 and G4_2 are illustrated in FIG. 3).

It should be noted that the number and arrangement of the common electrodes 9 disposed on the opposing substrate 4 may be variously modified as discussed later. Although FIG. 3 illustrates that each gate line 6 is arranged to intersect one section of the display region corresponding to one common electrode 9, each gate line 6 may be arranged to intersect a plurality of sections corresponding to a plurality of common electrodes 9 depending on the arrangement of the common electrodes 9.

The liquid crystal driver IC 2 has three functions of: driving the source lines 5 connected with the source outputs S1 to Sn (only four source outputs are illustrated in FIG. 3), driving the common electrodes 9-1 to 9-4 and generating control signals to control the gate drive circuit 8.

Figure 4:
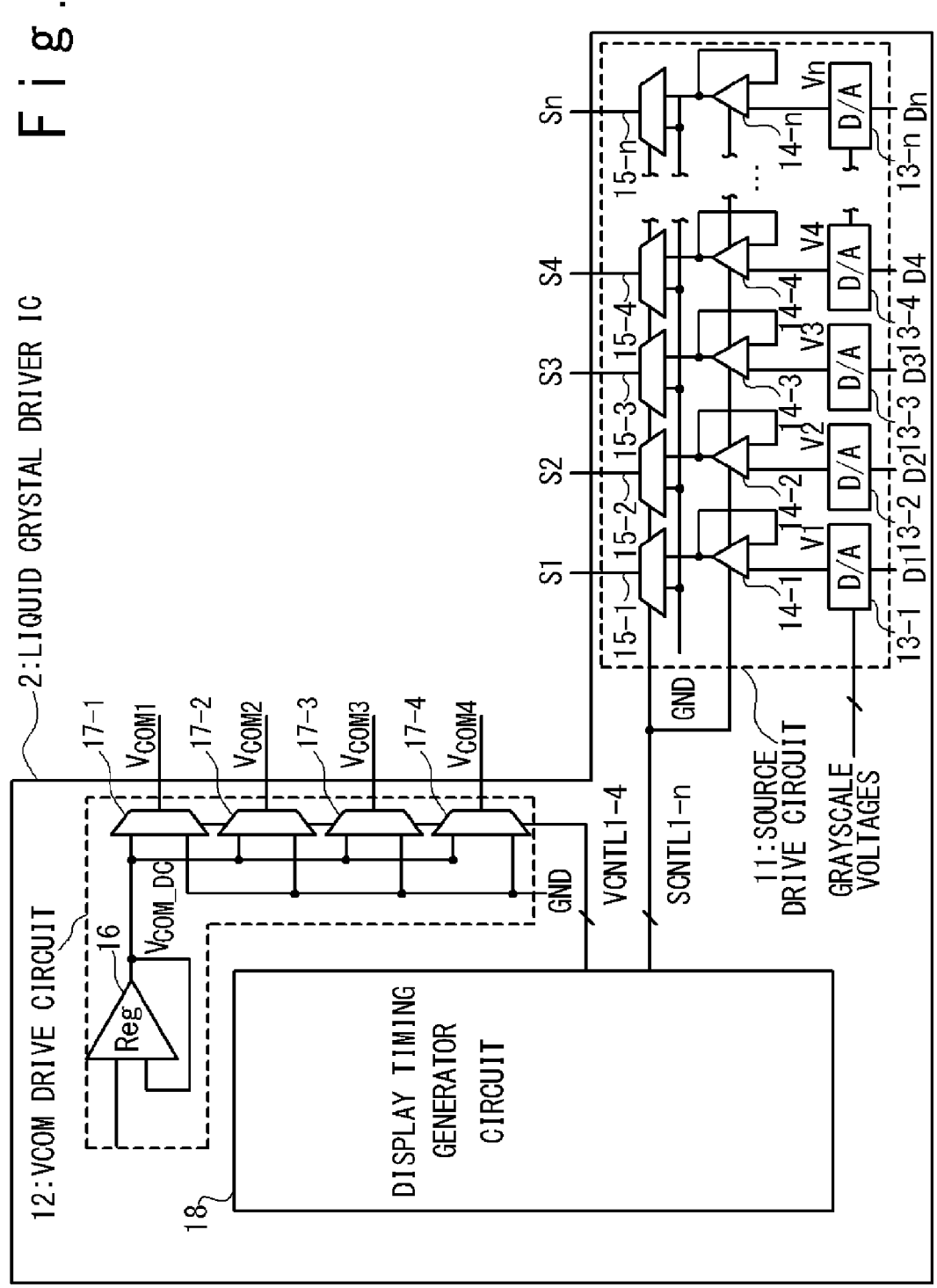
FIG. 4 is a circuit diagram illustrating exemplary configurations of a source drive circuit and a VCOM drive circuit included in the liquid crystal display device in an embodiment.

More specifically, the liquid crystal driver IC 2 includes a source drive circuit 11 and a VCOM drive circuit (common electrode drive circuit) 12. FIG. 4 is a circuit diagram illustrating exemplary configurations of the source drive circuit 11 and the VCOM drive circuit 12. In FIG. 4, the numeral 18 denotes a display timing generator circuit. The liquid crystal driver IC 2 further includes a control circuit which generates control signals to control the gate drive circuit 8 (which may be referred to as a panel interface circuit, not illustrated in FIGS. 3 and 4).

The source drive circuit 11 is fed with image data indicative of the grayscale levels of the respective subpixels 7 (that is, the voltage levels to which the respective source lines 5 are to be driven in each horizontal sync period). In FIG. 4, the symbol "Di" denotes image data corresponding to the subpixels 7 connected with the source line 5 connected with the source output Si, where i is a natural number equal to or less than n. The source drive circuit 11 drives subpixels 7 connected with the "selected" gate line 6 (that is, the gate line 6 driven to the "high" level) to the voltage levels corresponding to the grayscale levels indicated by the image data D1 to Dn via the source lines 5. It should be noted that the image data D1 to Dn may be input image data externally fed to the liquid crystal driver IC 2 from an external device or image data obtained by performing a correction calculation on the input image data externally fed to the liquid crystal driver IC 2.

It should be noted that the source drive circuit 11 is adapted to an AC drive scheme in this embodiment. In driving each subpixel 7 disposed in a section(s) in which an image is displayed on the liquid crystal display panel 1, an operation in which the subpixel 7 is driven to positive pixel voltage levels (that is, pixel voltage levels higher than the common level $V_{COM\_DC}$) for N frame periods (N is an natural number equal to or more than one) and an operation in which the subpixel 7 is driven to negative pixel voltage levels (that is, pixel voltage levels lower than the common level $V_{COM\_DC}$) for N frame periods are repeated in turn. If N equals one, a so-called "frame inversion drive" is achieved; in this case, the polarity of the pixel voltage level fed to each subpixel is reversed every frame period. The liquid crystal display device in this embodiment uses a common DC drive scheme (or a common constant drive scheme). In other words, the common level $V_{COM\_DC}$ is kept at a constant bias level in both of the cases when the subpixels are driven to positive pixel voltage levels with respect to the common level $V_{COM\_DC}$ and when the subpixels are driven to negative pixel voltage levels with respect to the common level $V_{COM\_DC}$.

The source drive circuit 11 is also adapted to selectively drive one or more desired source lines 5 to the circuit ground level GND. When a partial display is to be performed, the source lines 5 connected with ones of the subpixels 7 connected with the selected gate line 6 disposed in the section(s) in which no image is displayed on the liquid crystal display panel 1 are set to the circuit ground level GND. In other words, the pixel electrodes 7b of the subpixels 7 in the section(s) in which no image is displayed on the liquid crystal display panel 1 out of the subpixels 7 connected with the selected gate line 5 are driven to the circuit ground level GND. As described later, the configuration of the source drive circuit 11 which allows driving desired source lines 5 to the circuit ground level GND is of significance for performing a partial display with reduced power consumption.

More specifically, the source drive circuit 11 includes D/A converters 13-1 to 13-n, output amplifiers 14-1 to 14-n and selectors 15-1 to 15-n. One D/A converter 13-i, one output amplifier 14-i and one selector 15-i are prepared for one source output Si. Each D/A converter 13-i performs digital-to-analog conversion on the corresponding image data Di to generate a pixel voltage level corresponding to the image data Di on the output thereof. The output amplifiers 14-1 to 14-n are each configured as a voltage follower; each output amplifier 14-i outputs an output voltage level substantially equal to the pixel voltage level Vi on the output of the D/A converter 13-i. Each selector 15-i is responsive to a control signal SCNTLi received from the display timing generator circuit 18 for selecting one of the circuit ground level GND and the output voltage level received from the output amplifier 14-i and driving the source output Si to the selected voltage level.

FIG. 4 illustrates the configuration in which the n control signals SCNTL1 to SCNTLn are fed to the selectors 15-1 to 15-n, respectively, and the selectors 15-1 to 15-n operate in response to the control signals SCNTL1 to SCNTLn, respectively. Alternatively, the source drive circuit 11 may be configured so that the each selector 15-i includes a decoder decoding control signals received from the display timing generator circuit 18 to select one of the circuit ground level GND and the pixel voltage level received from the corresponding D/A converter 13-i. This configuration effectively reduces the total number of signals fed to the selectors 15-i to 15-n from the display timing generator circuit 18.

The VCOM drive circuit 12 drives the common electrodes 9-1 to 9-4 of the opposing substrate 4. The VCOM drive circuit 12 is configured to individually drive the common electrode 9-1 to 9-4; the VCOM drive circuit 12 drives selected one(s) of the common electrodes 9-1 to 9-4 to the common level $V_{COM\_DC}$ while driving a non-selected common electrode(s) 9 to the circuit ground level GND.

In detail, the VCOM drive circuit 12 includes a VCOM power supply 16 and selectors 17-1 to 17-4. The VCOM power supply 16 generates the common level $V_{COM\_DC}$. The selector 17-1 has an output connected with the common electrode 9-1, and sets the voltage level $V_{COM1}$ on the common electrode 9-1 to the common level $V_{COM\_DC}$ or the circuit ground level GND in response to a control signal VCNTL1 received from the display timing generator circuit 18. Correspondingly, the selector 17-2 has an output connected with the common electrode 9-2, and sets the voltage level $V_{COM2}$ on the common electrode 9-2 to the common level $V_{COM\_DC}$ or the circuit ground level GND in response to a control signal VCNTL2 received from the display timing generator circuit 18. A similar configuration applies for the selectors 17-3 and 17-4. The selector 17-3 sets the voltage level $V_{COM3}$ on the common electrode 9-3 to the common level $V_{COM\_Dc}$ or the circuit ground level GND in response to a control signal VCNTL3 received from the display timing generator circuit 18 and the selector 17-4 sets the voltage level $V_{COM4}$ on the common electrode 9-4 to the common level $V_{COM\_DC}$ or the circuit ground level GND in response to a control signal VCNTL4 received from the display timing generator circuit 18.

In the following, a description is given of an exemplary operation of the liquid crystal display device in this embodiment. The liquid crystal display device in this embodiment is adapted to the full-screen display in which images are displayed in the entire display region of the liquid crystal display panel 1, and the partial display in which images are displayed in a selected section(s) of the four sections of the display region of the liquid crystal display panel 1, the four sections being associated with the common electrodes 9-1 to 9-4, respectively.

FIG. 5 is a timing chart of the operation of the liquid crystal display device in an embodiment in the case when the full-screen display is performed. To achieve the full-screen display, all the subpixels 7 in the entire display region of the liquid crystal display panel 1 are driven with all the common electrodes 9-1 to 9-4 driven to the common level VCOM DC by the VCOM drive circuit 12. In detail, the gate lines 6 in the entire display region of the liquid crystal display panel 1 are sequentially selected (that is, sequentially driven to the "high" level) by the gate drive circuit 8. The source lines 5 are driven in synchronization with the driving operation of the gate lines 6. When a certain gate line 6 is selected, the TFTs 7a of the subpixels 7 connected with the selected gate line 6 are turned on. In the meantime, the source lines 5 are driven to the pixel voltage levels to which the subpixels 7 connected with the selected gate line 6 are to be driven, respectively. This effectively achieves driving the pixel electrodes 7b of the subpixels 7 connected with the selected gate line 6 to the desired pixel voltage levels. Note that the subpixels 7 in the entire display region of the liquid crystal display panel 1 are driven with an AC drive scheme when the full-screen display is performed.

FIG. 6 is a timing chart illustrating an exemplary operation of the liquid crystal display device in an embodiment in the case when a partial display in which an image is displayed only in the section corresponding to the common electrode 9-1 of the liquid crystal display panel 1. With the partial display in which an image is displayed only in the section corresponding to the common electrode 9-1, only the common electrode 9-1 is driven to the common level $V_{COM\_DC}$ and the remaining common electrodes 9-2 to 9-4 are set to the circuit ground level GND. In the meantime, the gate lines 6 in the entire display region of the liquid crystal display panel 1 are sequentially selected and driven by the gate drive circuit 8.

It should be noted that, in the operation illustrated in FIG. 6, the gate lines 6 in the entire display region of the liquid crystal display panel 1 are sequentially driven although a partial display is performed. In displaying an image, it is originally unnecessary to drive gate lines 6 in a section(s) in which the image is not displayed; however, to allow the gate drive circuit 8 to perform different operations between the case when the full-screen display is performed and the case when the partial display is performed, the gate line drive circuit 8 is designed with a specific design. This may undesirably increase the cost (e.g., of manufacturing). In the case when the gate drive circuit 8 drives the gate lines 6 with the same drive operation in both of the cases of the full-screen display and the partial display as illustrated in FIG. 6, no special design is required for the gate line drive circuit 8. It should be noted however that the drive operation of the gate lines 6 by the gate line drive circuit 8 may be switched between the full-screen display and the partial display as described later in detail.

In synchronization with the drive operation of the gate lines 6, subpixels 7 in the section in which an image is displayed (that is, the section corresponding to the common electrode 9-1) are respectively driven to desired pixel voltage levels. In detail, when a gate line G1_i which intersects the section corresponding to the common electrode 9-1 is selected (i is a natural number equal to or less than m), the TFTs 7a of the subpixels 7 connected with the selected gate line G1_i are turned on. Furthermore, the respective source lines 5 (that is, the respective source outputs S1 to Sn) are driven to pixel voltage levels to be fed to the corresponding subpixels 7 connected with the selected gate line G1_i. As a result, the pixel electrodes 7b of the subpixels 7 connected with the selected gate line G1_i are driven to the desired pixel voltage levels. It should be noted that the subpixels 7 in the section in which an image is displayed are driven with an AC drive scheme also when a partial display is performed.

On the other hand, the subpixels 7 in the sections in which no image is displayed (that is, the sections corresponding to the common electrodes 9-2 to 9-4) are driven to the circuit ground level GND. In detail, when a gate line G2_i which intersects the section corresponding to the common electrode 9-2 is selected (i is a natural number equal to or less than m), the TFTs 7a of the subpixels 7 connected with the selected gate line G2_i are turned on. In the meantime, the respective source lines 5 (that is, the respective source outputs S1 to Sn) are set to the circuit ground level GND. As a result, the pixel electrodes 7b of the subpixels 7 connected with the selected gate line G2_i are driven to the circuit ground level GND. A similar configuration applies to the case when a gate line G3_i which intersects the common electrode 9-3 in the liquid crystal display panel 1 is selected and the case when a gate line G4_i which intersects the common electrode 9-4 is selected. When a gate line G3_i which intersects the common electrode 9-3 in the liquid crystal display panel 1 is selected, the respective source lines 5 (that is, the respective source outputs S1 to Sn) are set to the circuit ground level GND and thereby the pixels electrodes 7b of the subpixels 7 connected with the selected gate line G3_i are set to the circuit ground level GND. Correspondingly, when the gate line G4_i which intersects the common electrode 9-4 in the liquid crystal display panel 1 is selected, the respective source lines 5 (that is, the respective source outputs S1 to Sn) are set to the circuit ground level GND and thereby the pixels electrodes 7b of the subpixels 7 connected with the selected gate line G4_i are set to the circuit ground level GND.

Figure 7A:
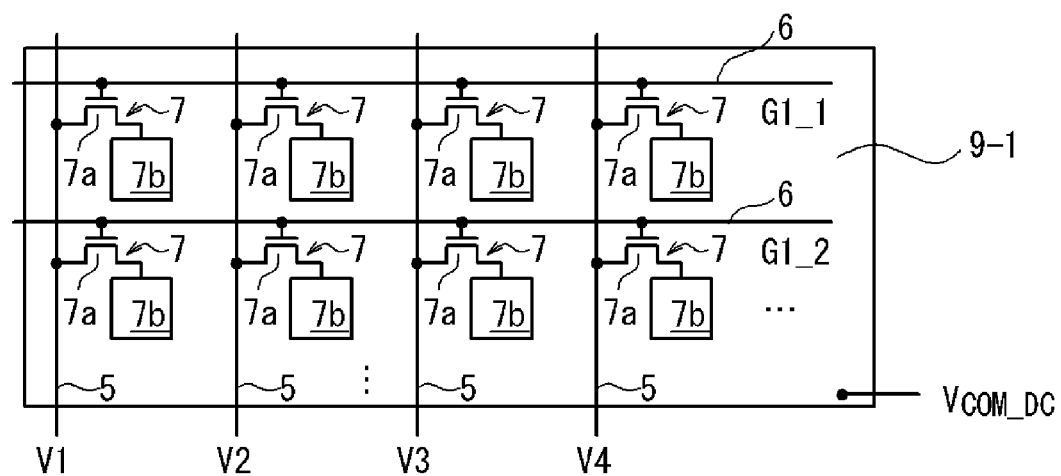
FIG. 7A is a conceptual diagram illustrating the voltage levels on respective nodes in the section in which an image is displayed in the display region of the liquid crystal display panel.

FIG. 7A is a conceptual diagram illustrating the voltage levels on the respective nodes in the section in which an image is displayed on the liquid crystal display panel 1 (that is, the section corresponding to the common electrode 9-1) in this embodiment. The source lines 5 connected with the source outputs S1 to Sn are respectively driven in synchronization with the selection of the gate line G1_i to the pixel voltage levels V1 to Vn to which the subpixels 7 connected with the gate line G1_i are to be driven (only the source lines 5 connected with the source outputs S1 to S4 are illustrated in FIG. 7A), while the common electrode 9-1 is driven to the common level $V_{COM\_DC}$. It should be noted that the subpixels 7 in the section corresponding to the common electrode 9-1 are driven with an AC drive scheme. The polarity of the pixel voltage level fed to each subpixel 7 (where the polarity is defined with respect to the common level $V_{COM\_DC}$) is reversed every predetermined number of frame periods, while the common electrode 9-1 is kept at the common level $V_{COMP\_DC}$.

Figure 7B:
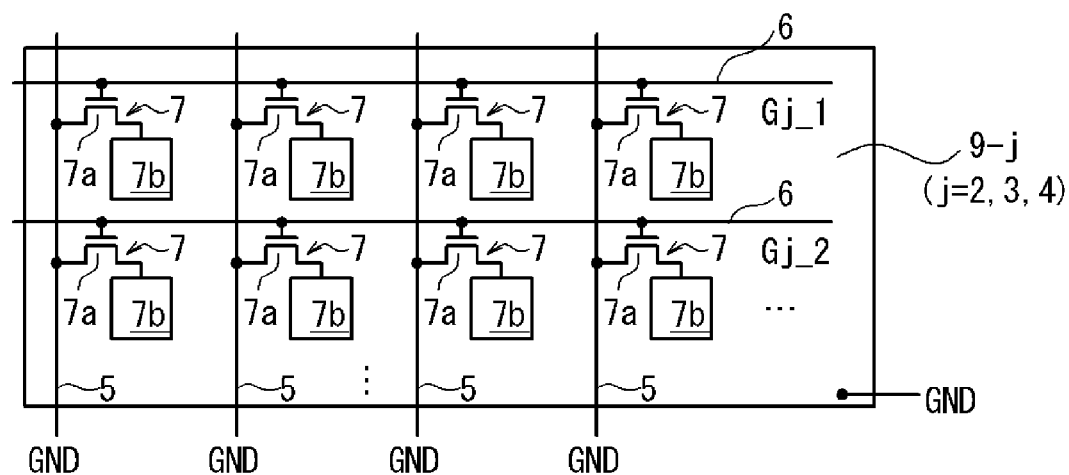
FIG. 7B is a conceptual diagram illustrating the voltage levels on respective nodes in the section in which the image is not displayed in the display region of the liquid crystal display panel.

FIG. 7B, on the other hand, is a conceptual diagram illustrating the voltage levels on the respective nodes in the sections in which no image is displayed on the liquid crystal display panel 1 (that is, the sections corresponding to the common electrodes 9-2 to 9-4) in this embodiment. When the common electrodes 9-2 to 9-4 are set to the circuit ground level GND and any of the gate lines 6 corresponding to the common electrodes 9-2 to 9-4 is selected, the source lines 5 connected with the source outputs S1 to Sn are set to the circuit ground level GND. The result is that the voltage level of the pixel electrodes 7b of the subpixels 7 in the sections in which no image is displayed on the liquid crystal display panel 1 is equal to that on the common electrode 9 opposed thereto. In other words, substantially no DC bias is applied between the pixel electrodes 7b of the subpixels 7 in the sections in which no image is displayed and the common electrode 9 opposed thereto. As thus described, an AC drive scheme is not applied to the subpixels 7 in the sections in which no image is displayed on the liquid crystal display panel 1.

In the above-described operation of the liquid crystal display device in this embodiment, the voltage level on the pixel electrodes 7b of the subpixels 7 in the sections in which no image is displayed is set to be equal to that on the common electrodes 9 opposed thereto; no DC bias is applied therebetween. This effectively avoids damage to liquid crystal filled between the pixel electrodes 7b and the common electrodes 9. In the meantime, the power consumption in performing the partial display is reduced, since an AC drive scheme is not applied to the subpixels 7 in the section(s) in which no image is displayed in the liquid crystal 1.

Although the above-describe embodiment only describes the partial display in which an image is displayed in the section corresponding to the common electrode 9-1 in the display region of the liquid crystal display panel 1, an image may be displayed in the section(s) corresponding to any desired common electrode(s) 9 in the partial display. In this case, the common electrode(s) 9 corresponding to the section(s) in which an image is displayed on the liquid crystal display panel 1 is driven to the common level $V_{COMP\_DC}$, and the common electrode(s) 9 corresponding to the section(s) in which the image is not displayed is driven to the circuit ground level GND. In the meantime, the pixel electrodes 7b of the subpixels 7 in the section(s) in which the image is displayed are driven to desired pixel voltage levels and the pixel electrodes 7b of the subpixels 7 in the section(s) in which the image is not displayed are set to the circuit ground level GND.

Described above are embodiments in which the common electrode(s) 9 corresponding to the section(s) in which no image is displayed and the pixel electrodes 7b of the subpixels 7 in the section(s) are both set to the circuit ground level GND. It should be noted however that, in general, the common electrode(s) 9 corresponding to the section(s) in which no image is displayed and the pixel electrodes 7b of the subpixels 7 in the section(s) may be set to a certain reference voltage level. The reference voltage level may be the circuit ground level GND as described above or a predetermined voltage level different from the circuit ground level GND. In this case, the common electrode(s) 9 corresponding to the section(s) in which no image is displayed is set to the reference voltage level, and the source lines 5 are set to the reference voltage level when a gate line 6 which intersects the section(s) in which no image is displayed is selected. It should be noted however that the circuit ground level GND is preferably used as the reference voltage level, since the use of the circuit ground level GND as the reference voltage level eliminates the need of feeding electric power to keep the common electrode(s) 9 corresponding to the section(s) in which no image is displayed at the reference voltage level.

In order to further reduce the power consumption of the liquid crystal display device, the liquid crystal display device may be configured so that the drive of the gate lines 6 which intersect the section(s) in which no image is displayed on the liquid crystal display panel 1 is skipped. It should be noted, however, that the skip of the drive of the gate lines 6 which intersect the section(s) in which no image is displayed may cause a problem that charge accumulated in the subpixels 7 in the section(s) are not discharged. In order to avoid this problem, it is preferable that all the gate lines 6 are sequentially driven for a predetermined number of vertical sync periods (or frame periods) after the partial display is started, and subsequently, only the gate lines 6 which intersect the section(s) in which an image is displayed on the liquid crystal display panel 1 are sequentially driven.

FIG. 8 is a timing chart illustrating an example of the operation of the liquid crystal display device in the case when a partial display is started at a k-th vertical sync period, in which an image is displayed only in the section corresponding to the common electrode 9-1 of the display region of the liquid crystal display panel 1.

In the operation illustrated in FIG. 8, all the gate lines 6 in the display region of the liquid crystal display panel 1 are sequentially driven for one vertical sync period (or one frame period) after the partial display is started. In other words, all the gate lines 6 are sequentially driven in the k-th vertical sync period (or k-th frame period). In this operation, the common electrodes 9 corresponding to the sections in which no image is displayed and the pixel electrodes 7b of the subpixels 7 in the sections are both set to the circuit ground level GND. This operation allows discharging charge accumulated in the subpixels 7 in the sections in which no image is displayed.

Subsequently, in vertical sync periods in which the partial display is continued, only the gate lines 6 which intersect the section in which an image is displayed on the liquid crystal display panel 1 are sequentially selected and driven; the gate lines 6 which intersect the sections in which no image is displayed on the liquid crystal display panel 1 are not driven. As illustrated in FIG. 8, only the gate lines G1_1 to G1_$m$, which intersect the section corresponding to the common electrode 9-1, are sequentially driven in the (k+1)-th vertical sync period (or the (k+1)-th frame period); the other gate lines 6 are not driven in the (k+1)-th vertical sync period. Subsequently, the same operation as the (k+1)-th vertical sync period is performed as long as the partial display is continued.

It should be noted that the operation illustrated in FIG. 8 is effectively achieved by the gate drive circuit 8 driving the gate lines 6 in response to control signals received from the liquid crystal driver IC 2.

Although the above-described embodiments disclose that four common electrodes 9-1 to 9-4 arrayed in the Y-axis direction are formed on the opposing substrate 4, the number and arrangement of the common electrodes 9 formed on the opposing substrate 4 may be variously modified.

Figure 9:
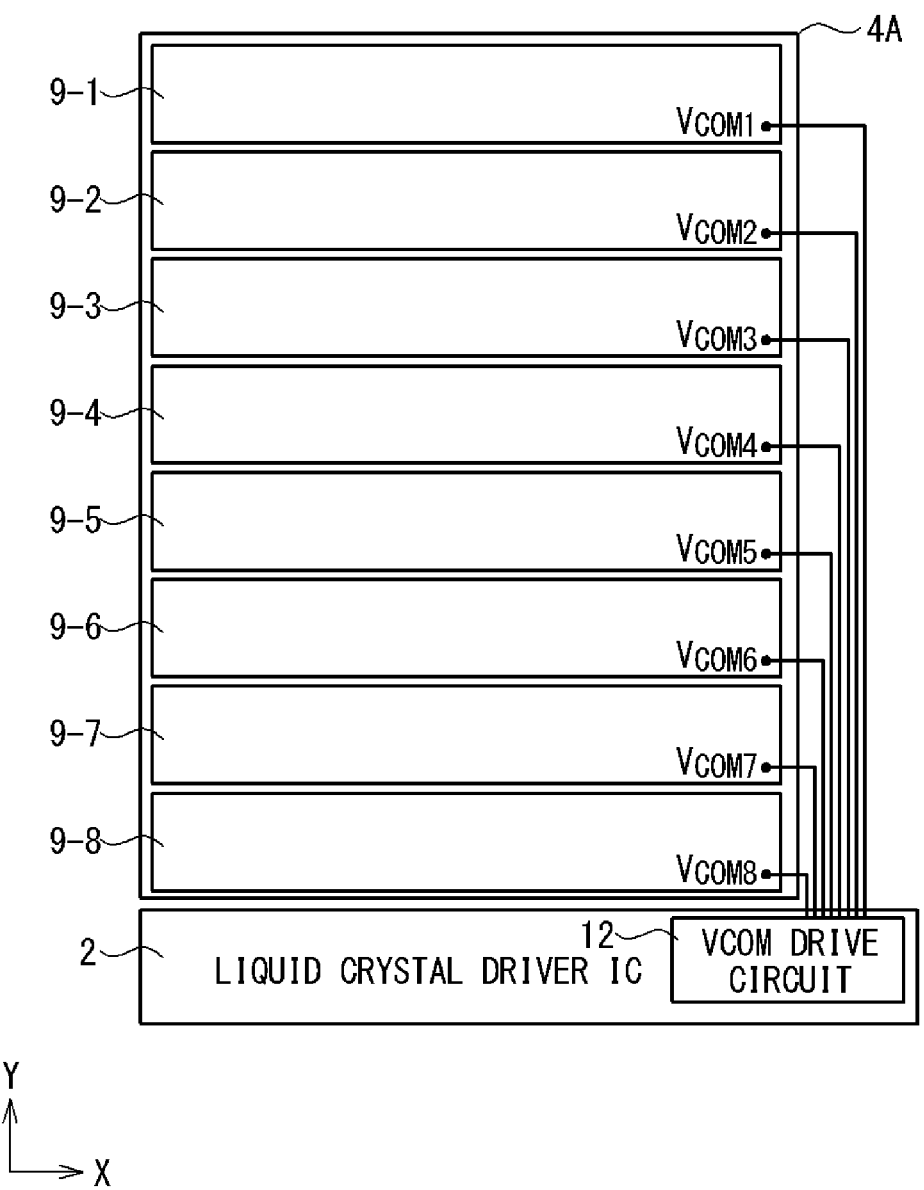
FIG. 9 is a diagram illustrating a modification of the configuration of the opposing substrate of the liquid crystal display device in an embodiment.

FIG. 9 illustrates a first modification of the configuration of the opposing substrate. In the configuration illustrated in FIG. 9, eight common electrodes 9-1 to 9-8 are arrayed in the Y-axis direction on the opposing substrate 4A. When a partial display is performed, desired one or more common electrodes 9 are selected by the VCOM drive circuit 12 and the selected common electrodes 9 are driven to the common level $V_{COMP\_DC}$. The non-selected common electrodes 9 are driven to the circuit ground level GND. In the meantime, the subpixels 7 in the section(s) in which an image is displayed are driven to desired pixel voltage levels, respectively, and the subpixels 7 in the section(s) in which no image is displayed are set to the circuit ground level GND. It should be noted that the liquid crystal display device illustrated in FIG. 9 may be operated to perform the operation illustrated in FIG. 8, in which all gate lines 6 are sequentially driven for a predetermined number of vertical sync period(s) (or frame period(s)) after a partial display is started and subsequently only the gate lines 6 which intersect the section in which an image is displayed on the liquid crystal display panel 1 are sequentially driven.

Figure 10:
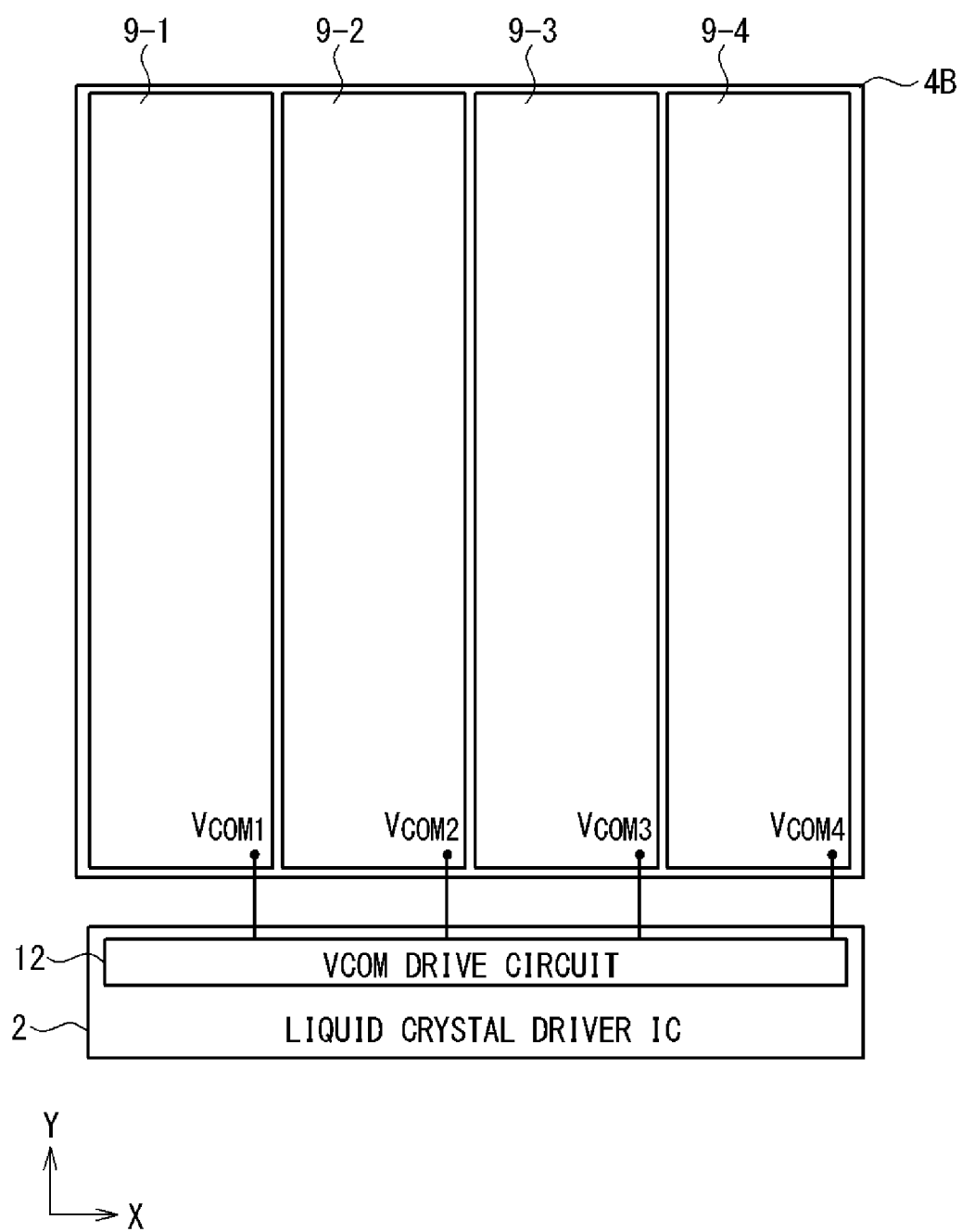
FIG. 10 is a diagram illustrating another modification of the configuration of the opposing substrate of the liquid crystal display device in an embodiment.

FIG. 10 illustrates a second modification of the configuration of the opposing substrate. In the configuration illustrated in FIG. 10, four common electrodes 9-1 to 9-4 are arrayed in the X-axis direction on the opposing substrate 4B. When a partial display is performed, one or more desired common electrodes 9 are selected from the common electrodes 9-1 to 9-4 by the VCOM drive circuit 12 and the selected common electrodes 9 are driven to the common level $V_{COM\_DC}$. The non-selected common electrodes 9 are set to the circuit ground level GND.

In performing a partial display in the configuration illustrated in FIG. 10, all the gate lines 6 in the display region are sequentially driven (the operation illustrated in FIG. 8 is not adopted), since all the gate lines 6 intersect the selected common electrode(s) 9 of the common electrodes 9 9-1 to 9-4 that is selected as corresponding to the section(s) in which an image is displayed. In the meantime, only the subpixels 7 in the section(s) in which the image is displayed are driven to desired pixel voltage levels, while the subpixels 7 in the section(s) in which the image is not displayed are set to the circuit ground level GND. In order words, the source lines 5 in the section(s) in which the image is not displayed are set to the circuit ground level GND by the source drive circuit 11, when a gate line 6 is selected.

Figure 11:
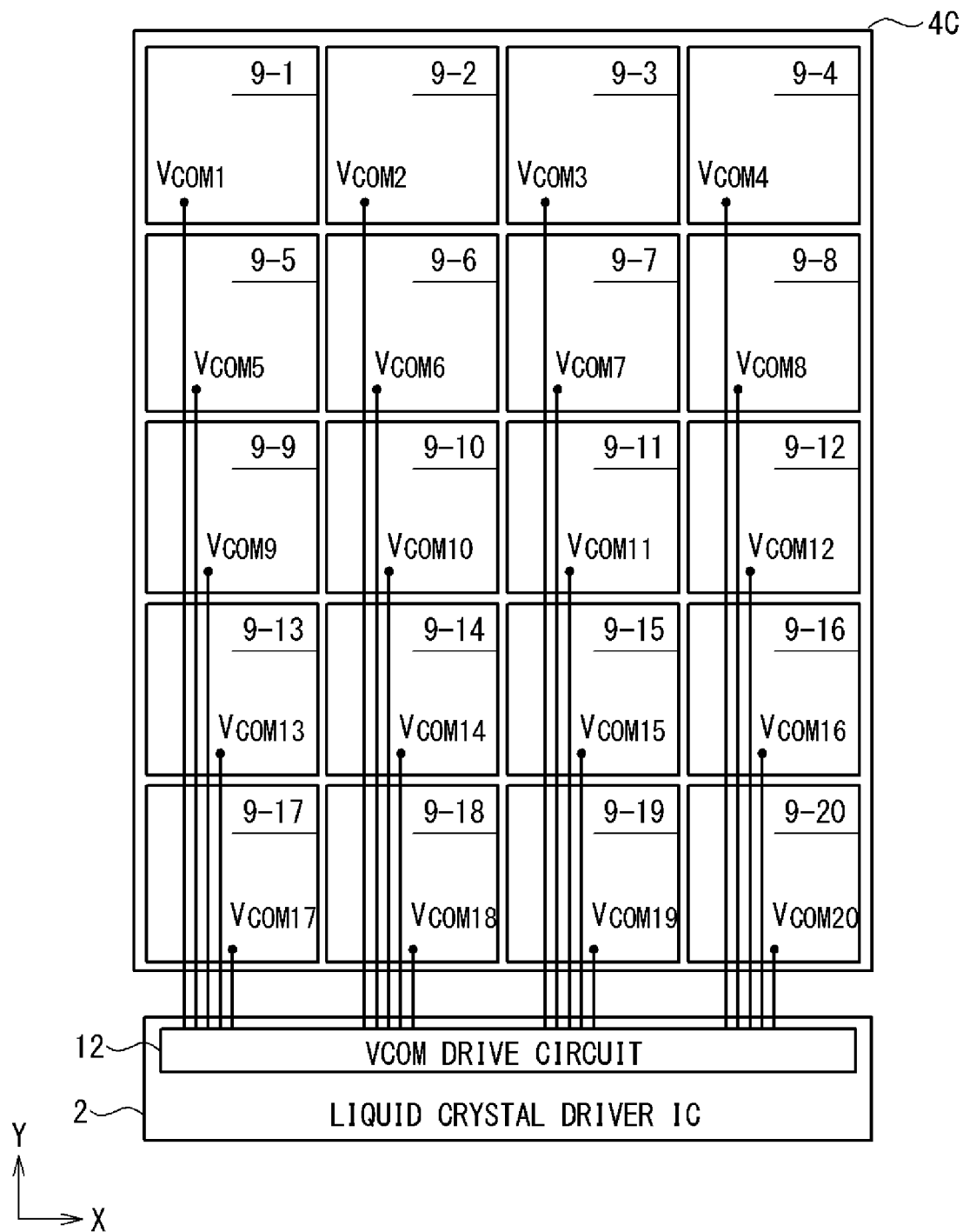
FIG. 11 is a diagram illustrating still another modification of the configuration of the opposing substrate of the liquid crystal display device in an embodiment.

FIG. 11 illustrates a third modification of the configuration of the opposing substrate. In the configuration of FIG. 11, 20 common electrodes 9-1 to 9-20 are arrayed in rows and columns on the opposing substrate 4B. When a partial display is performed, desired one or more of the common electrodes 9 are selected from the common electrodes 9-1 to 9-20 and the selected common electrodes are driven to the common voltage level $V_{COM\_DC}$. The non-selected common electrodes are set to the circuit ground level GND.

In the meantime, the subpixels 7 in the sections in which an image is displayed are driven to desired pixel voltage levels, respectively, and the subpixels 7 in the sections in which no image is displayed are set to the circuit ground level GND. It should be noted that, in the configuration illustrated in FIG. 11, the gate lines 6 which intersect the sections in which the image is displayed may be connected with not only subpixels disposed in the sections in which the image is displayed, but also subpixels disposed in the sections in which the image is not displayed.

In order to address this problem, when the opposing substrate 4B illustrated in FIG. 11 is used, the liquid crystal display panel 1 is driven as follows: when a gate line 6 which intersects a section in which the image is displayed is selected, the source lines 5 connected with the subpixels 7 which are connected with the selected gate line 6 and disposed in the sections in which the image is displayed are driven to desired pixel voltage levels, and the source lines 5 connected with the subpixels which are connected with the selected gate line 6 but disposed in the sections in which the image is not displayed are driven to the circuit ground level GND. The source drive circuit 11, which is configured to individually set the source outputs S1 to Sn to the circuit ground level GND as illustrated in FIG. 4, is adapted to such operation.

It should be noted that the operation illustrated in FIG. 8, in which all the gate lines 6 are sequentially driven for a predetermined number of vertical sync periods (or frame periods) after the partial display is started, and subsequently only the gate lines 6 which intersects the sections in which the image is displayed on the liquid crystal display panel 1 are sequentially driven, may be used for the configuration illustrated in FIG. 11.

Next, a description is given of a more specific implementation of the liquid crystal display device in this embodiment. FIG. 12 is a block diagram illustrating an exemplary configuration of a portable terminal 10 (for example, a cellular phone, a smartphone or a tablet terminal) in which a liquid crystal display device of one of the above-described embodiments are integrated. The portable terminal 10 illustrated in FIG. 12 includes a main board 21, a microphone 22, a speaker 23 and an antenna module 24, in addition to the above-described liquid crystal display panel 1. Mounted on the main board 21 are an audio interface 31, a baseband/application processor 32, a DSP (digital signal processor) 33, and ASIC (application specific integrated circuit) 34, a microcontroller 35, a high frequency interface 36 and a memory 37. The above-described liquid crystal driver IC 2 is mounted on the main board 21. The image data corresponding to images to be displayed on the liquid crystal display panel 1 are fed from the baseband/application processor 32 to the liquid crystal driver IC 2. The liquid crystal driver IC 2 drives the liquid crystal display panel 1 in response to the image data and control data received from the baseband/application processor 32.

Figure 13A:
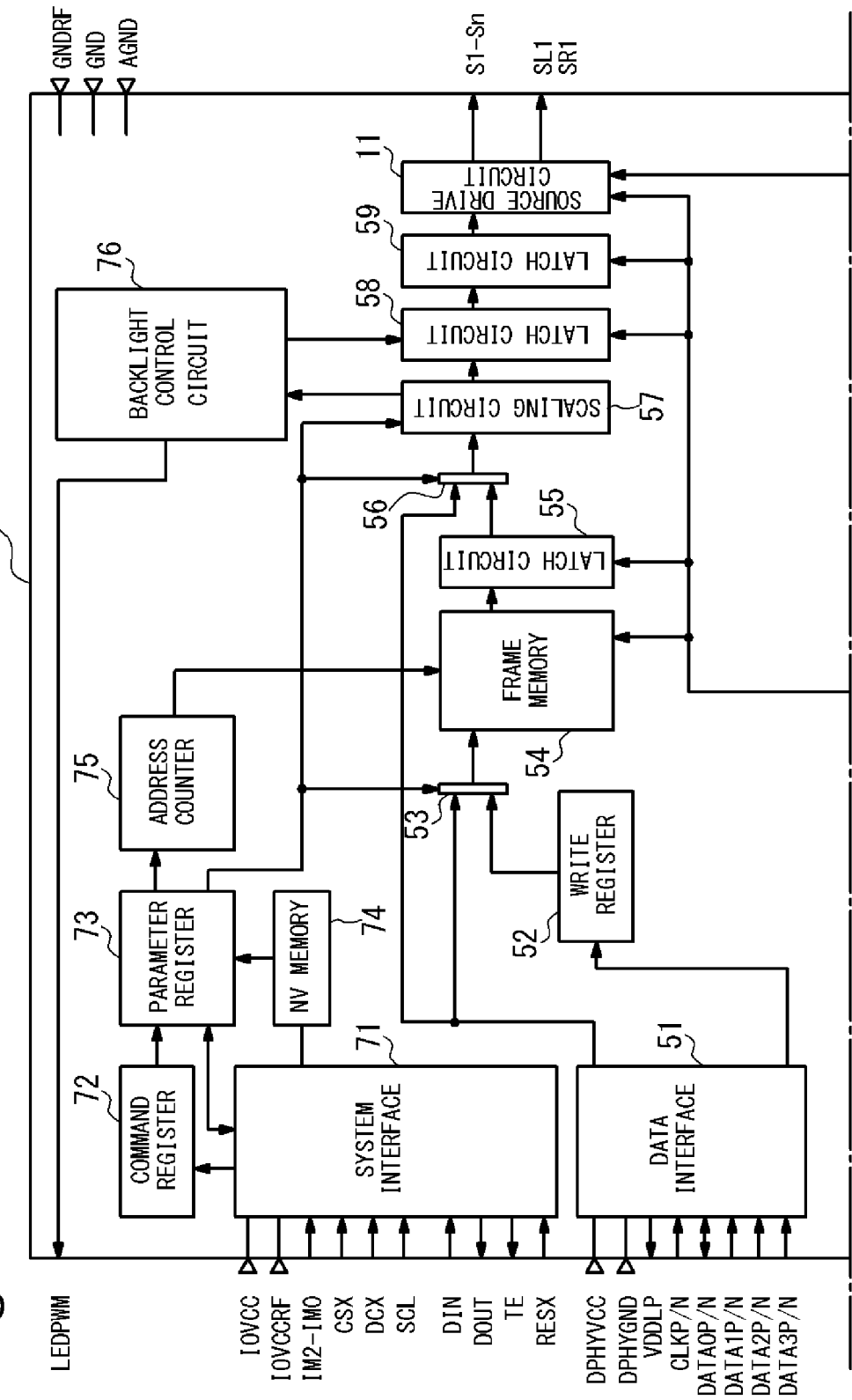

FIGS. 13A and 13B are block diagrams more specifically illustrating an exemplary configuration of the liquid crystal driver IC 2 of the above-described embodiment; note that the block diagrams are dividedly illustrated in FIGS. 13A and 13B. Overall, the liquid crystal driver IC 2 illustrated in FIGS. 13A and 13B includes a data drive circuitry (11, 51 to 61), a control circuitry (71 to 80) and a power supply circuitry (81 to 83).

The data drive circuitry is configured to generate pixel voltage levels to be output from the source outputs S1 to Sn. The data drive circuitry includes, in addition to the source drive circuit 11, a data interface 51, a write register 52, a selector 53, a frame memory 54, a latch circuit 55, a selector 56, a scaling circuit 57, latch circuits 58, 59, a gamma calculation circuit 60 and a grayscale voltage generator circuit 61.

Schematically, the respective circuits in the data drive circuitry operate as follows: The data interface 51 externally receives image data $D_{IN}$ corresponding to images to be displayed on the liquid crystal display panel 1. The write register 52 temporarily stores image data to be written into the frame memory 54. The selector 53 selectively connects the input of the frame memory 54 with the data interface 51 or the write register 52. The frame memory 54 stores therein the image data $D_{IN}$. The latch circuit 55 reads out image data from the frame memory 54 in units of horizontal lines of pixels; note that a horizontal line of pixels means pixels connected with one gate line. The selector 56 selectively connects the input of the scaling circuit 57 to the data interface 51 or the latch circuit 55. The scaling circuit 57 performs arithmetic processing for scaling of images. The latch circuits 58 and 59 temporarily stores image data received from the scaling circuit 57. The source drive circuit 11 drives the source outputs S1 to Sn to desired pixel voltage levels in response to the image data received from the latch circuit 59.

The control circuitry includes a system interface 71, a command register 72, a parameter register 73, a non-volatile memory 74, an address counter 75, a backlight control circuit 76, a timing generator circuit 77, a panel interface circuit 78, an oscillator circuit 79 and a touch panel sync output circuit 80.

The respective circuits of the control circuitry schematically operate as follows: The system interface 71 exchanges control signals and control data with an external device. The command register 72 stores control commands externally received from the external device. The parameter register 73 stores various register values used for control of the liquid crystal driver IC 2. The non-volatile memory 74 stores register values to be set to the parameter register 73 and to be stored in a non-volatile manner. The address counter 75 generates addresses of the frame memory 54 to be accessed. The backlight control circuit 76 generates control signals for controlling a backlight (not shown).

The timing generator circuit 77 performs timing control of the entire liquid crystal drive IC 2. The above-described display timing generator circuit 18, which generates the control signals SCTRL1 to SCTRLn fed to the source drive circuit 11 and control signals VCTRL1 to VCTRL4 fed to the VCOM drive circuit 12 (see FIG. 4), is incorporated within the timing generator circuit 77.

The panel interface circuit 78 generates gate control signals SOUT1 to SOUT32 fed to the gate drive circuit 8 in the liquid crystal display panel 1. The gate drive circuit 8 operates in response to the gate control signals SOUT1 to SOUT32. Note that the operation of the gate drive circuit 8 for the full-screen display has been already described with reference to FIG. 5 and the operation of the gate drive circuit 8 for the partial display has been already described with reference to FIG. 6 or 8.

The oscillator circuit 79 feeds to the timing generator circuit 77 a clock signal used as a reference of the timing control of the entire liquid crystal driver IC 2. The tough panel sync output circuit 80 generates synchronization signals to be transmitted to circuits which perform drive and detection processing for a touch panel.

The power supply circuitry includes a liquid crystal drive power supply circuit 81, an internal logic power supply regulator 82 and an internal reference voltage generator circuit 83. The liquid crystal drive power supply circuit 81 operates on an analog power supply voltage VCI and generates various power supply voltages used in the liquid crystal driver IC 2. The above-described VCOM drive circuit 12 is incorporated within the liquid crystal drive power supply circuit 81. The internal logic power supply regulator 82 includes circuits for generating a logic power supply voltage VDD.

Although embodiments of the present invention are specifically described above, the present invention should not be construed as being limited to the above-described embodiment. It would be apparent to a person skilled in the art that actual implementations of the present invention may be modified and changed without departing from the scope of the invention.

What is claimed is:
1. A liquid crystal display device, comprising:
   a liquid crystal display panel; and
   a liquid crystal driver configured to drive said liquid crystal display panel,
   wherein said liquid crystal display panel includes:
      a first substrate on which a plurality of subpixels each including a pixel electrode are integrated; and a second substrate opposed to said first substrate, a plurality of common electrodes being formed on said second substrate, wherein a display region of said liquid crystal display panel is divided into a plurality of sections respectively corresponding to said plurality of common electrodes, and wherein the liquid crystal driver is configured to:

when a partial display in which an image is selectively displayed in a section selected from said plurality of sections is performed, drive a common electrode corresponding to said selected section of said plurality of common electrodes to a predetermined common voltage level, set a common electrode corresponding to a non-selected section of said plurality of common electrodes to a predetermined reference level, drive pixel electrodes of subpixels in said selected section of said plurality of subpixels to pixel voltage levels corresponding to image data, and set pixel electrodes of subpixels in said non-selected section of said plurality of subpixels to said reference voltage level.

2. The liquid crystal display device according to claim 1, wherein:

said reference voltage level is substantially equal to a circuit ground level of said liquid crystal driver.

3. The liquid crystal display device according to claim 1, further comprising:

a gate drive circuit configured to:

drive gate lines disposed in said display region of said liquid crystal display panel.

4. The liquid crystal display device according to claim 3, wherein:

the gate drive circuit is further configured to:

sequentially drive said gate lines in said display region when said partial display is performed and when a full-screen display in which an image is displayed in the entire display region is performed.

5. The liquid crystal display device according to claim 1, further comprising:

a gate drive circuit configured to:

drive gate lines disposed in said display region of said liquid crystal display panel.

6. The liquid crystal display device according to claim 5, wherein the gate driver circuit is further configured to:

sequentially drive said gate lines in said display region for a predetermined number of vertical sync periods after said partial display is started, when said partial display is performed.

7. The liquid crystal display device according to claim 6, wherein the gate driver circuit is further configured to:

after sequentially driving said gate lines for the predetermined number of vertical sync periods, sequentially drive only gate lines which intersect said selected section in vertical sync periods following said predetermined number of vertical sync periods.

8. A liquid crystal driver for driving a liquid crystal display panel including: a first substrate on which a plurality of subpixels each including a pixel electrode and a plurality of source lines connected with said plurality of subpixels are integrated; and a second substrate opposed to said first substrate, a plurality of common electrodes being formed on said second substrate, said liquid crystal driver comprising:

a common electrode drive circuit configured to drive said plurality of common electrodes; and a source drive circuit configured to drive said plurality of source lines, wherein said common electrode drive circuit is configured to:

when a partial display in which an image is selectively displayed in a section selected from a plurality of sections is performed, said plurality of sections being defined in a display region of said liquid crystal display panel so as to respectively correspond to said plurality of common electrodes, drive a common electrode corresponding to said selected section of said plurality of common electrodes to a predetermined common voltage level and set a common electrode corresponding to non-selected section of said plurality of common electrodes to a predetermined reference level, and wherein said source drive circuit is configured to:

when a partial display in which an image is selectively displayed in a section selected from a plurality of sections is performed, drive pixel electrodes of subpixels in said selected section to pixel voltage levels corresponding to image data via said source lines and set pixel electrodes of subpixels in said non-selected section to said reference voltage level.

9. The liquid crystal driver according to claim 8, wherein:

said reference voltage level is substantially equal to a circuit ground level of said liquid crystal driver.

10. The liquid crystal driver according to claim 8, further comprising:

a control circuit configured to control a gate drive circuit driving gate lines disposed in said display region of said liquid crystal display panel.

11. The liquid crystal driver according to claim 10, wherein:

said control circuit is configured to control said gate drive circuit to sequentially drive substantially all of said gate lines in said display region either when said partial display is performed and when a full-screen display in which an image is displayed in the entire display region is performed.

12. The liquid crystal driver according to claim 8, further comprising:

a control circuit configured to control a gate drive circuit that is configured to drive gate lines disposed in said display region of said liquid crystal display panel.

13. The liquid crystal driver according to claim 12, wherein:

the control circuit is further configured to control said gate drive circuit to sequentially drive substantially all of said gate lines in said display region for a predetermined number of vertical sync periods after said partial display is started.

14. The liquid crystal driver according to claim 13, wherein:

the control circuit is further configured to control said gate drive circuit to sequentially drive only gate lines which intersect said selected section in vertical sync periods following said predetermined number of vertical sync periods, after driving substantially all of said gate lines in said display region.

15. A driving method for driving a liquid crystal display panel including: a first substrate on which a plurality of subpixels each including a pixel electrode are integrated; and a second substrate opposed to said first substrate, a plurality of common electrodes being formed on said second substrate, and said method comprising:

performing a partial display in which an image is selectively displayed in a section selected from a plurality of sections defined in a display region of aid liquid crystal display panel to respectively correspond to said plurality of common electrodes, wherein in said performing said partial display, a common electrode corresponding to said selected section of said plurality of common electrodes is driven to a predetermined common voltage level, a common electrode corresponding to non-selected section of said plurality of common electrodes is set to a predetermined reference level, pixel electrodes of subpixels in said selected section of said plurality of subpixels are driven to pixel voltage levels corresponding to image data and pixel electrodes of subpixels in said non-selected section of said plurality of subpixels are set to said reference voltage level.

16. The driving method according to claim 15, wherein:
said reference voltage level is substantially equal to a circuit ground level of a liquid crystal driver driving said liquid crystal display panel.

17. The driving method according to claim 15, wherein:
performing said partial display comprises sequentially driving substantially all gate lines disposed in said display region for a predetermined number of vertical sync periods after said partial display is started.

18. The driving method according to claim 17, wherein:
performing said partial display further comprises sequentially driving only gate lines which intersect said selected section in vertical sync periods following said predetermined number of vertical sync periods, after sequentially driving substantially all of said gate lines.

19. The driving method according to claim 15, further comprising:
sequentially driving substantially all gate lines disposed in said display region when said partial display is performed.

20. The driving method according to claim 15, further comprising:
sequentially driving substantially all gate lines disposed in said display region when a full-screen display in which an image is displayed in the entire display region is performed.

* * * * *